United States Patent [19]
Key et al.

[11] Patent Number: 5,991,272
[45] Date of Patent: *Nov. 23, 1999

[54] METHOD AND APPARATUS FOR CONTROLLING A COMMUNICATIONS NETWORK

[75] Inventors: Peter Bernard Key, Suffolk, United Kingdom; Andrew David Atkinson, Bern, Switzerland; Thomas Rhodri Griffiths, Banbury, United Kingdom

[73] Assignee: British Telecommunications public limited company, London, United Kingdom

[ * ] Notice: This patent issued on a continued prosecution application filed under 37 CFR 1.53(d), and is subject to the twenty year patent term provisions of 35 U.S.C. 154(a)(2).

[21] Appl. No.: 08/663,221
[22] PCT Filed: Dec. 2, 1994
[86] PCT No.: PCT/GB94/02648
  § 371 Date: Nov. 14, 1996
  § 102(e) Date: Nov. 14, 1996
[87] PCT Pub. No.: WO95/17061
  PCT Pub. Date: Jun. 22, 1995

[30] Foreign Application Priority Data

Dec. 16, 1993 [GB] United Kingdom ............... 9325746

[51] Int. Cl.⁶ .......................... G01R 31/08; G06F 11/00; G08C 15/00
[52] U.S. Cl. .......................... 370/252; 370/229
[58] Field of Search .................. 370/229, 230, 370/232, 233, 235, 252, 253, 468

[56] References Cited

U.S. PATENT DOCUMENTS

| | | | |
|---|---|---|---|
| 4,984,264 | 1/1991 | Katsube | 370/230 |
| 5,166,894 | 11/1992 | Saito | 370/252 |
| 5,289,462 | 2/1994 | Ahmadi et al. | 370/232 |
| 5,357,507 | 10/1994 | Hughes et al. | 370/234 |
| 5,381,404 | 1/1995 | Sugano et al. | 370/252 |

FOREIGN PATENT DOCUMENTS

A 0433699 6/1991 European Pat. Off. .

OTHER PUBLICATIONS

Kelly "Effective Bandwidths at Multi–Class Queues ", Queueing Systems 9 (1991) 5–16.

Hui, "A Congestion Measure for Call Admission and Traffic Engineering for Multi–Layer Multi–Rate Traffic ", International Journal of Digital and Analog Communication System, vol. 3, No. 2, Jun. 1990, UK, pp. 127–135.

*Primary Examiner*—Chi H. Pham
*Assistant Examiner*—Steven Nguyen
*Attorney, Agent, or Firm*—Nixon & Vanderhye P.C.

[57] ABSTRACT

A method of controlling acceptance of a call by a network node in a communication network having a required quality of service includes the steps of determining an infimum of a function of the probability of the node being overloaded if the call if accepted and determining from that infimum the effective bandwidth of the calls to the node if that call should be accepted and determining a corresponding quality of service. The corresponding quality of service is then compared with a quality of service that is required for satisfactory operation of the network. If the quality if maintained or exceeded then the call is accepted for the node.

29 Claims, 6 Drawing Sheets

| Service Class | Service | Declared Peak Mbps | Bit Rate Type |
|---|---|---|---|
| 1.1 | Telephony, Fax data Retrieval | (0, 0.064] | CBR |
| 1.2 | Interactive Services | (0, 0.064] | VBR |
| 2.1 | Video Conferencing | (0.064, 2] | CBR |
| 2.2 | Video Telephony (HQ), Interactive Data | (0.064, 2] | VBR |
| 3.1 | Video Conferencing | (2, 10] | CBR |
| 3.2 | Video Interactive Data | (2, 10] | VBR |
| 4.1 | Video Codecs | (10, 140] | CBR |
| 4.2 | Lan interconnection | (10, 140] | VBR |

| Region | Threshold Regions for 64 kbps Calls | Threshold Regions for 2 Mbps Calls | Value for θ |
|---|---|---|---|
| θ₁ | [1890,2156] | [0,345] | 12.23 |
| θ₂ | [0,1890] | [0,270] | 0.8333 |
| θ₃ | [0,1890] | [271,345] | 0.4143 |

METHOD AND APPARATUS FOR CONTROLLING A COMMUNICATIONS NETWORK

BACKGROUND OF THE INVENTION

1. Field of the Invention

This invention relates to a method and apparatus for controlling a communication network, particularly, but not exclusively, an asynchronous transfer mode (ATM) network.

2. Related Art

ATM networks are controlled to allow statistical multiplexing of calls which enables more calls to be carried than if Synchronous Transfer Mode (STM) methods are used.

Each node or resource in a communication network will have a certain carrying capacity. The capacity comprises an ability for that node to carry a certain number and type of calls. A call comprises a number of connections each connection being a logical end to end link. In order to prevent a node being overloaded it is necessary to control the acceptance of calls by the node and this is achieved by Connection Acceptance Control (CAC) methods.

The revenue generation from any telecommunication network is closely linked to the number of calls allowed onto the network. Therefore, a CAC algorithm needs to be chosen which will maximise the number of calls admitted to the network, whilst maintaining call Quality of Service (QoS), and considering the network resources available. Of additional importance is the speed with which the CAC algorithm makes call acceptance decisions, as this impacts on the subjective customer perception of the service provided.

The QoS of a network or a node of a network depends on various parameters or sets of parameters. The parameters include the probability of the loss of a particular cell of data as it travels through the network, called the cell loss probability (a cell being a time division of the multiplexing scheme containing the packet of data, which is 48 bytes/octets of information and 5 bytes/octets of control information); cell delay which is a measure of the delay a cell experiences as it passes through the network; and cell delay variation which is a measure of the differences in the cell delay times of different cells.

Present CAC methods utilise a procedure called convolution. Convolution based methods are accurate but require considerable computational power and, even then, take a long time causing delays in call set-up on the network which may be unacceptable for certain types of call or services. This problem becomes more and more significant as the mixture of calls becomes more varied. For example, a Broadband Integrated Services Digital Network (BISDN) could carry calls carrying voice data, digital TV data, digital high definition TV data, teleconferencing data, and multimedia data. The data will have different characteristics, for example it could be constant bit rate or variable bit rate and the bandwidth required may also be different, for example, a voice call might require 64 kbps, but a video call might require 140 Mbps. Each node in the network will be able to carry either a certain number of identical connections with the same bandwidth requirements, for example, all voice or, as is more likely, a certain number of different types of calls with different bandwidth requirements, for example, both voice and video.

The rate of a cell stream within a call may also be statistically varying. The statistical variations of the cell stream are often modelled by distributions such as Normal, Guassian, on-off or Bernoulli. A moment generating function of a particular distribution is a way of summarising the behaviour of the distribution in terms of its statistical variation.

In his paper "A Congestion Measure for Call Admission and Traffic Engineering for Multi-Layer Multi-Rate Traffic" (International Journal of Digital and Analog Communication Systems, Volume 3, No. 2, June 1990, UK pp 127–135) Joseph Y. Hui discusses the use of the Chernoff bound to derive a relationship between a quality of service parameter and the traffic carried by a resource in a network. This relationship can be used in a connection admission control method, which is potentially faster than known convolution methods.

SUMMARY OF THE INVENTION

According to a first aspect of the invention there is provided a method of controlling acceptance of a call for a node in a communication network, the node having a call carrying capacity C and the network having a required quality of service, which method comprising:

determining a function, $f(t)$, of the probability of the node being overloaded if the call is accepted;

determining a value $\theta$ which gives an infimum of the function $f(t)$;

determining from the value $\theta$ an effective bandwidth if the call is accepted onto the node;

determining from the effective bandwidth and the capacity C a quality of service should the call be accepted; and comparing the determined quality of service with the required quality of service and if the determined quality of service is not less than the required quality of service accepting the call for the node.

According to another aspect of the invention there is provided a method of controlling acceptance of a call for a node in a communication network, the node having a call carrying capacity and the network having a required quality of service, the method comprising:

determining a theta value for a mix of call types;

determining an effective bandwidth for each call type in the mix of call types that would be handled by the node were called to be accepted;

determining from said effective bandwidths and said capacity a quality of service were the call to be accepted;

comparing the determined quality of service with the required quality of service and if the determined quality of service is not worse than the required quality of service, accepting the call for the node;

and being characterised in that said theta value determination involves a comparison of the number of calls of a particular call type ($nc_{ik}$ that would be carried by the node were the call to be accepted and at least one threshold value of number of calls.

By utilising the effective bandwidth determined from the value $\theta$ the quality of service may be determined more quickly than the previous convolution methods. By comparing the number of calls of a particular call type with at least one threshold value of number of calls, a further improvement results. Preferably, the quality of service parameter used is cell loss probability and this is determined from the effective bandwidth utilising value $\theta$. This is compared with the required cell loss probability of the network and if the required cell loss probability is not exceeded the call is accepted for the node.

The capacity of the node, C, may be determined as the network operates or at an initial pre-operation stage and stored in the node or a network management system controlling the node. Similarly, the effective bandwidth may be calculated as the network operates from an "on-line" generated θ value or values or from stored θ value or values. The θ value or values may be stored in look up tables or other data structures and extracted when required. This will be preferable where an even faster control method is required.

The method may be carried out by each node in the network or by an element manager that controls all the nodes in the network.

Preferably, the required quality of service for a call is determined from parameters declared by the call. The declared parameters may be the required mean or peak bit rates, whether the call is constant bit rate or variable bit rate or other parameters. It may also be defined by the customer in a contract for the services.

According to a further aspect of the invention there is provided apparatus for controlling acceptance of a call for a network node, having a call carrying capacity C, in a communication network, which network having a required quality of service, comprising means for:

determining a value θ which gives an infimum of a function f(t) of the probability of the node being overloaded if the call is accepted;

determining from the value θ an effective bandwidth if the call is accepted onto the node;

determining from the effective bandwidth and the capacity C a quality of service for the node should the call be accepted; and comparing the determined quality of service with the required quality of service and if the determined quality of service is not less than the required quality of service accepting the call for the node.

According to a still further aspect of the invention there is provided apparatus for controlling acceptance of a call for a node in a communication network, the node having a call carrying capacity C and the network having a required quality of service, said apparatus comprising:

means for determining a theta value (θ) for a mix of call types;

means for determining an effective bandwidth for each call type in the mix of call types that would be handled by the node were the call to be accepted;

means for determining from said effective bandwidths and said capacity C a quality of service were the call to be accepted;

means for comparing the determined quality of service with the required quality of service and if the determined quality of service is not worse than the required quality of service, accepting the call for the node;

and being characterised in that said theta value (θ) determining means compares the number of calls of a particular call type ($nc_{ik}$) that would be carried by the node were the call to be accepted and at least one threshold value of number of calls.

BRIEF DESCRIPTION OF THE DRAWINGS

Specific embodiments of the invention will now be described by way of example only, with reference to the accompanying drawing in which:

FIGS. 4 and 5 show in schematic form data structures of the node shown in FIG. 3;

FIG. 10 shows in schematic form further data structures.

DETAILED DESCRIPTION OF EXEMPLARY EMBODIMENTS

Figure 1:
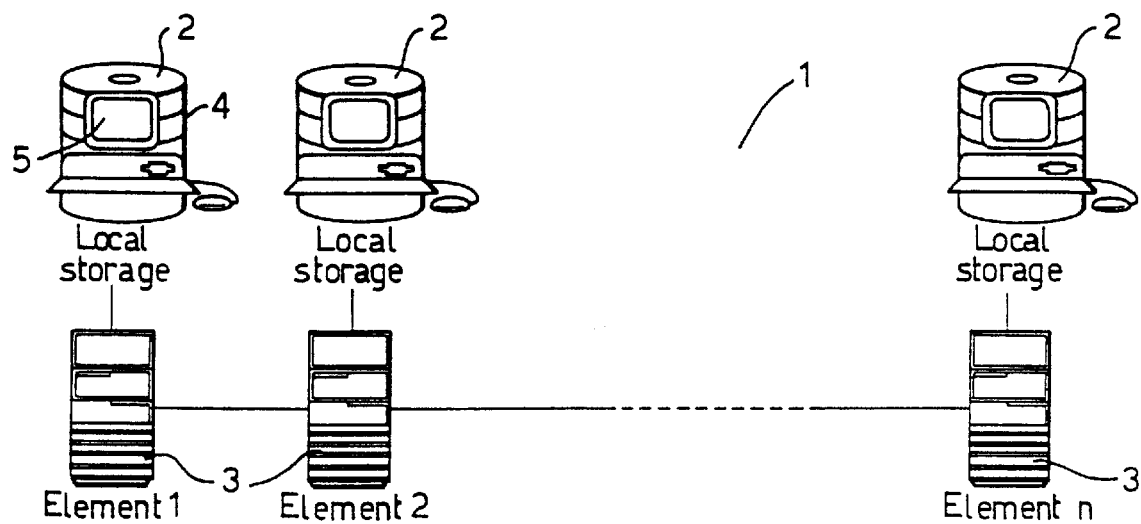
FIG. 1 shows a communications network operating in accordance with embodiments of the invention.
Figure 2:
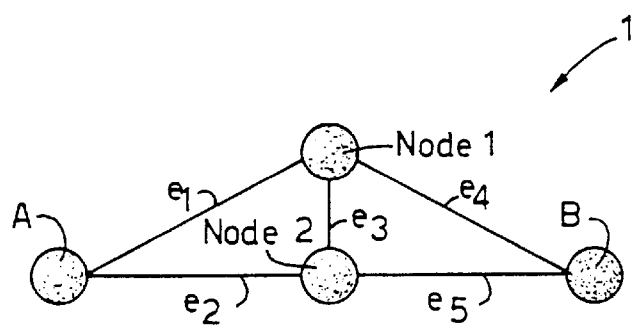
FIG. 2 is an illustrative diagram of the network shown in FIG. 1.

As shown in FIG. 1, a communications network generally indicated at 1 comprises a plurality of network nodes 2 and associated network elements 3. Each element 3 can be thought of as a switching element which transmits data from node to node in the network. The elements thus form transmission paths between nodes as is more clearly shown in FIG. 2.

The way in which calls are routed through the network is well known to those skilled in the art and could be governed by Eurescom P106 VP Handling Functional Model, Dynamic Alternate Routing or Adaptive Alternative Routing. Call set up is achieved by a well known signalling protocol such as ITU specification Q2931.

Each node controls its associated elements 3, that is to say the communications network 1 has localised control as opposed to central control where there is a central element manager. The node 2 comprises a data store 4 and a computer 5. Each element 3 and each computer 5 and data stores 4 is of known type and will thus not be described in greater detail.

Figure 3:
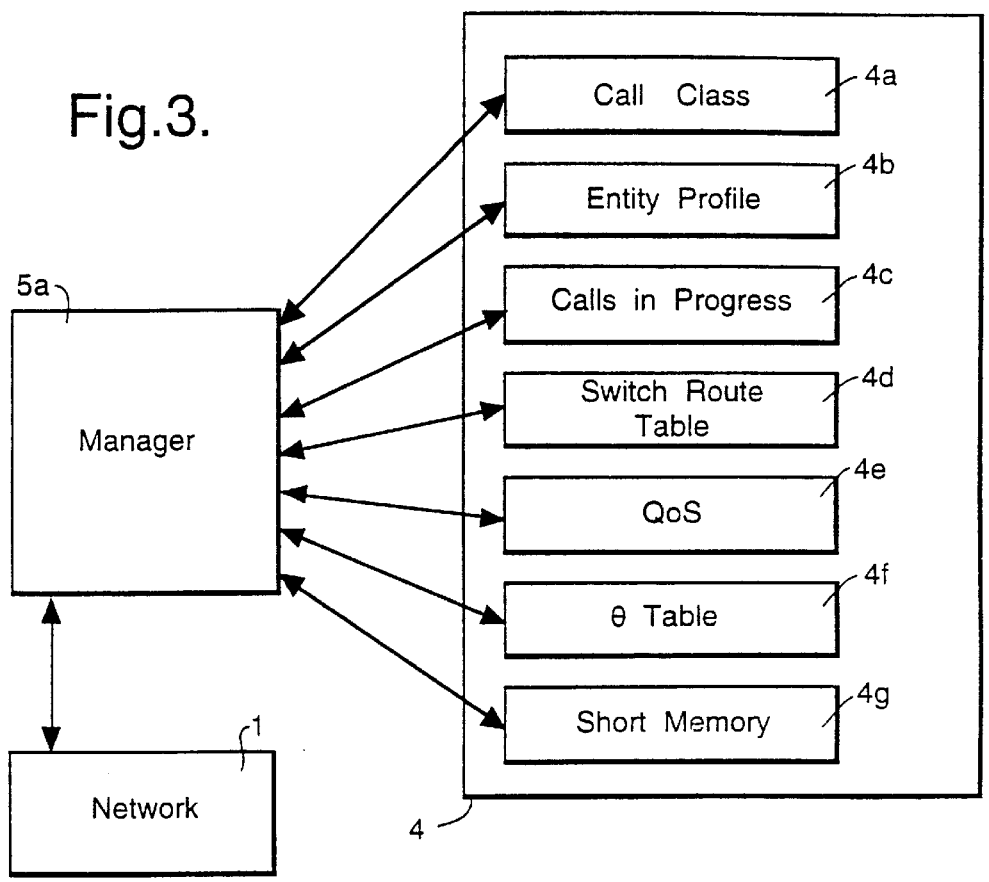
FIG. 3 shows in schematic block diagram form a node of the network adopting the role of an element manager.

Each element controls acceptance of calls onto itself. Each element can therefore be considered as shown in FIG. 3. The data store comprises a number of data storage areas 4a to 4g.

Figures 4, 10:
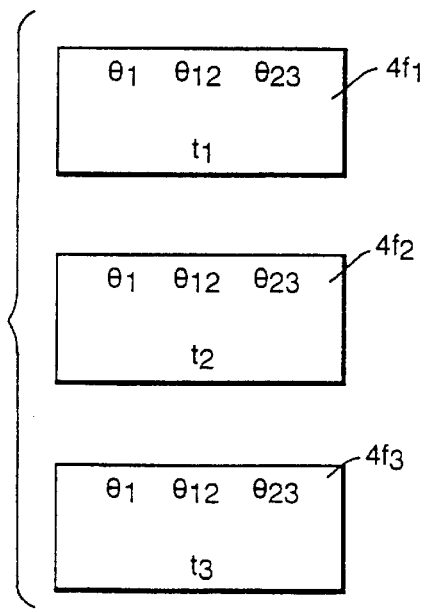

Storage area 4a stores information for classifying calls and is called the call class data store. The call class data store comprises a memory structure configured in the form of a look-up table. The look-up table is shown in FIG. 4 and it comprises four data fields, $4a_1$, $4a_2$, $4a_3$ and $4a_4$. Data filed $4a_1$ contains a service class number. Data field $4a_2$ contains a description of the service as a string of characters. Data field $4a_3$ contains peak rate ranges in Mbps (Mega bits per second) into which calls attempting connection to the network will fall and field $4a_1$ contains information about the bit rate types which can be CBR, constant bit rate, or VBR, variable bit rate.

Taking service class 3.1 for example it can be seen that it is a video conferencing service having a declared peak bit rate range of [2, 10] Mbps and the bit rate type is constant bit rate. (This means that the declared peak bit rate X will be 2<X≦10 Mbps).

Data store 4b is called the entity profile database because it contains a table of service class numbers and appropriate quality of service values, in this case the cell loss probability that is acceptable for the class. FIG. 5 shows the table and it can be seen that the service class numbers are contained in the data field $4b_1$, whilst the quality of service values are contained in the data field $4b_2$. Hence, it can be seen that a call of class 2.1 requires a quality of service having a cell loss probability of $1 \times 10^{-7}$ or better.

The entity profile allows potential calls to be compared and assigned a class. There are n service classes in the network defined by the vector $S=(s_1, \ldots s_n)$ where each of the elements in S are tuples describing the call classes, that is to say each element of vector S is a combination of entries of the tables shown in FIGS. 4 and 5.

Storage area 4c contains a matrix of information about the calls in progress throughout the network and is hence called a Calls In Progress data store. In greater detail, this stores the number of calls in progress for each network element, and for each call class using a network element for all the elements in the network. The matrix that is stored is called C in P which can be expressed as C in $P=(\bar{n}_1, \ldots, \bar{n}_m)$, where the $\bar{n}_i$ denotes the calls in progress on the element i, and there are m elements in the network. Each of the $\bar{n}_i$ decompose into an array which shows the number of calls of each class which are using the element that is to say $\bar{n}_i=(nc_{i1}, \ldots, nc_{in})$, for n classes and $i\epsilon(1, \ldots, m)$.

The integer matrix C in P is effectively an m×(n+1) matrix where the elements $\{nc_{ik}\}$ are defined as follows:

$$nc_{ik} = \begin{cases} \text{the number of connections on the element } i \text{ if } k = 0 \\ \text{the number of connections of class } k \text{ on element } i \text{ if } k \text{ is greater than } 0 \end{cases}$$

Storage area 4d contains a switch routing table which holds information about the adjacent nodes and elements in the network, such as, their call carrying capacity.

Storage area 4e contains a matrix of QoS relations. These are the effective bandwidths of each call type which is using the node at current time (called $a_{jk}$). It is a real matrix of size m×(n+2) which stores the current coefficients $a_{ik}$ in each service class for the m elements in the network and the n service classes. The (n+1)th column stores the real value $C_i\theta_{(t)}/\ln 10$ and the (n+2)th column stores the target cell loss probability for the element. The target QoS is found by considering the mix of classes on the element, and finding the lowest required cell loss probability for the classes.

$$QoS \text{ Relations Matrix is } \begin{bmatrix} a_{1,1} & - & a_{1,n} & a_{1,(n+1)} & a_{1,(n+2)} \\ a_{2,1} & - & a_{2,n} & a_{2,(n+1)} & a_{2,(n+2)} \\ a_{m,1} & - & a_{m,n} & a_{m,(n+1)} & a_{m,(n+2)} \end{bmatrix}$$

Data storage area 4f is configured as a table of data values $\theta$ which are to be used to generate effective bandwidth. The values of $\theta$ are for a number of mixes of call classes that will use a typical node and element in the network. The values $\theta$ are values which provide infimums for the function f(t) that is f($\theta$) is the infimum. The function f(t) may use the Chernoff bound to calculate the effective bandwidth for each class of call. The effective bandwidths are derived from the moment generating function. The theorem states that $$\ln(P\{Sn \geq C\}) \approx \inf_t[n\ln(M(t)) - tC]$$

where C is the capacity of the link.
Sn is the superposition of all calls, ie. the load on the link.
n is the number of calls.
M(t) is the moment generating function (which for example, for on-off traffic would be M(t)=mexp($\theta$p)+1−m. where m is the mean and p the peak)

The expression states that the natural logarithm of the probability of the link load (Sn) exceeding the link capacity C is given by the infimum (or the greatest lower bound) (over $\theta$) of the expression in square brackets. $\theta$ is a value of t which satisfied this theorem.

These are pre-calculated when the network is configured and stored in the tabular form so that appropriate $\theta$ values may be used to generate effective bandwidths without the $\theta$ values having to be generated each time.

The last data store 4g is a short term memory which stores a matrix of size m×(n+2) containing the QoS relations for the route of a connection. The matrix is created whenever a new call arrives in a manner that will be described later.

The computer 5 is programmed to carry out the method according to the invention. It provides an element managing function and thus can be considered as an element manager labelled 5a in the diagram. The element manager 5a has access to the data storage areas 4a to 4g and processes call information to control call acceptance by elements and nodes on the network 1 (including its associated element). The data storage areas 4a to 4f and its associated switching element are connected to the element manager 5a by databuses of a well known type.

Figure 6:
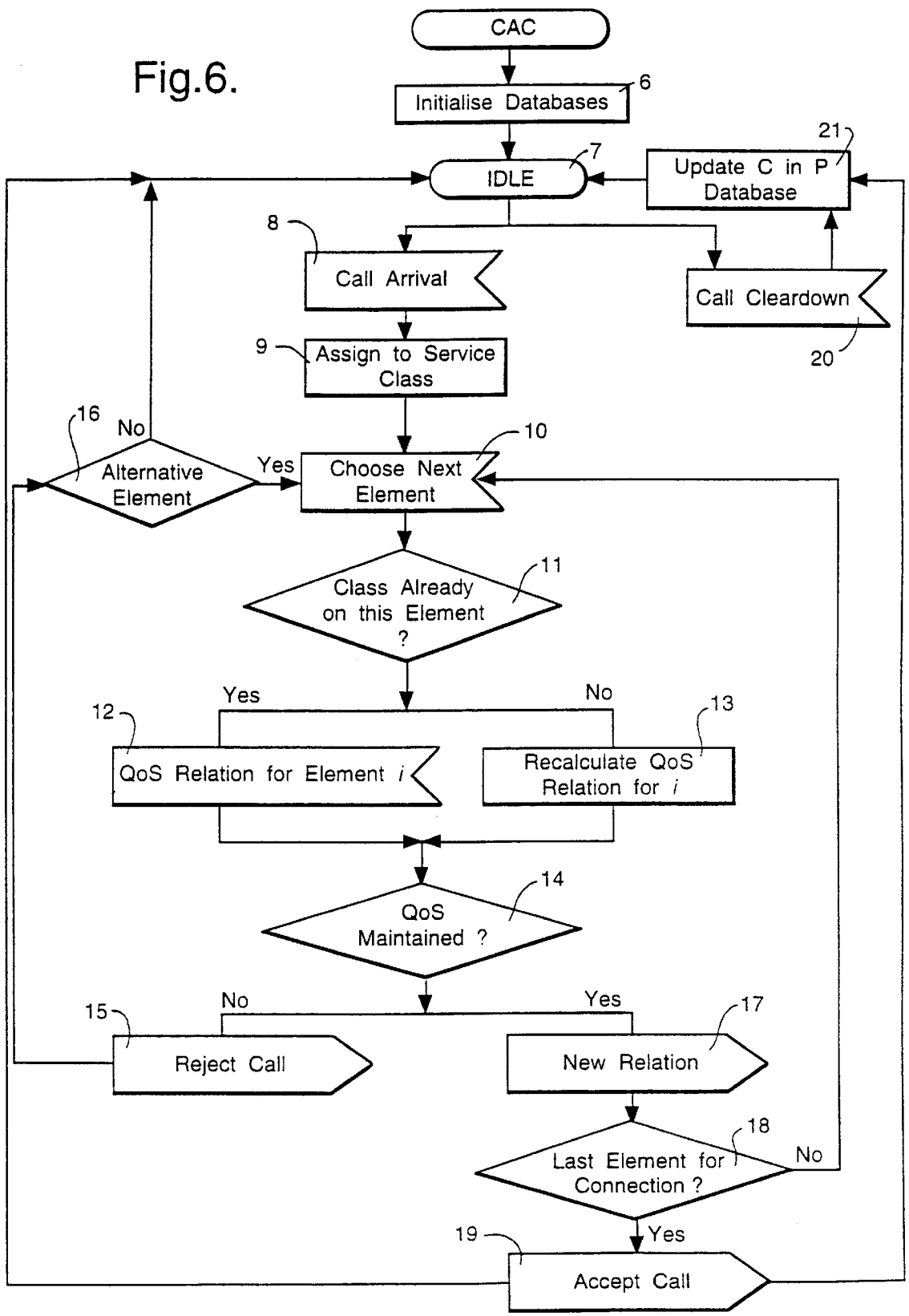
FIG. 6 is a chart of the network's operation.

The way in which a call is accepted or rejected for an element by each node in the network is illustrated by the flowchart shown in FIG. 6.

The first step is to initialise the data storage areas, block 6. This results in the previously described storage areas 4a to 4g being configured and initial values being entered including the calculation of $\theta$ values and their entry into the table stored in data storage area 4f.

The $\theta$ values are calculated off-line and loaded by the element manager 5a at initialisation. For example, if a call having a peak bit rate of 2 Mbits/sec and a mean of 0.2 Mbits/sec is to be multiplexed on a 140 Mbits/sec link then from Chernoff's theorem (also known as the Chernoff bound or the Large Deviation bound) it follows that:

$$\ln(P\{Sn \geq C\}) \approx \inf_t[n\ln(M(t)) - tC] \qquad (2)$$

Where C is the capacity of the link which for simplicity is expressed in terms of peak call bit rates that is to say 140/2=70.

Sn is the superposition of all calls that is to say the load on the link.

n is the number of calls.

M(t) is the moment generating function which for on-off traffic becomes M(t)=mexp(tp)+1−m where p is the peak bit rate which is now 1 because the capacity has been normalised by the peak call rate and m is the mean call rate which because the peak has been normalised to 1 should then be 0.2/2=0.1 therefore, $$M(t)=0.1 \exp(t)+1-0.1$$

Equation 2 is an expression that the natural logarithm of the probability of the load of a link (Sn) exceeding its capacity (C) is given by the infimum over $\theta$ (or the greatest lowest bound of the expression in the square brackets).

Theta is calculated off-line by differentiating the expression 2 with respect to t. Therefore the equation is $$\frac{d}{dt}\ln(P\{Sn \geq C\}) = \frac{nmp\exp(tp)}{m\exp(tp) + 1 - m} - C \quad (3)$$

For the minimum this derivative is set to zero and solved for t. The value of t is theta $$\frac{nmp\exp(tp)}{m\exp(tp) + 1 - m} - C = 0 \quad (4)$$

With the above conditions this simplifies to $$\frac{0.1n\exp(t)}{0.1\exp(t) + 0.9} - 70 = 0 \quad (5)$$

Thus, an appropriate value of $t=\theta$ for the above conditions is generated and stored for use by the element manager 5a.

In a similar way $\theta$ values for heterogenous mixes of call types can be derived for various numbers and mixes of calls to give a discrete range of values from which an appropriate $\theta$ value may be chosen for the load on the network whilst it is in operation.

The nodes in the network then await a call as represented by the idle block 7.

A call then arrives at a node as represented by call arrival block 8 and its declared characteristics compared by the element manager 5a with the characteristics stored in the call class storage area 4a and the appropriate call class determined. In this way the call is assigned to a class, block 9. For example, the call may have a declared peak bit rate of (0, 0.064]Mbps and be of a variable bit rate VBR type. (The notation (x,y] meaning a value greater than x but less than or equal to y, that is to say, in this case a value greater than 0 but less than or equal to 0.064). A service class of 1.2 equates to this declared peak and bit rate type. This value is returned to the element manager 5a which inputs this service class into the entity profile storage area and from FIG. 5 it can be seen that a quality of service value QoS of $1 \times 10^{-9}$ is returned. Thus the chosen element must offer a cell loss probability of not more than $1 \times 10^{-9}$.

The next step is to choose a suitable element to carry the call, block 10. The switch routing table 4d is consulted to choose a suitable element. The element is chosen for its ability to carry call of a particular class in the required logical direction through the network.

The element manager 5a then determines if a call of this class is already using the chosen element, block 11, by referring to the calls in progress storage area 4c. For example, consider the situation where a call is of class k and the chosen element is $e_1$. If there are calls of this class in progress on this element, the value of $nc_{ik}$ of the calls in progress matrix stored in storage 4c would be greater than zero. If this is so, the network manager 5a then inspects the quality of service relation, block 12, (to be described later) otherwise, the information is used to recalculate the quality of service relation, block 13, (as described later).

In the case of $n_{ik}$ being greater than zero, the element manager 5a inspects the quality of service relation stored in the storage area 4e and determines the effect of adding a call of type k on the element $e_i$ on the quality of service. This is represented by block 14. If the quality of service is still acceptable, that is to say, maintained, then the call is accepted for the element.

For the new call to be accepted $$\Rightarrow \text{Target } Qos \text{ for element } i \geq \quad (1)$$

$$a_{i1}nc_{i1} + a_{i2}nc_{i2} + \ldots + a_{ik}(nc_{ik} + 1) + \ldots + a_{in}nc_{in} - \frac{C_i\tilde{\theta}}{\ln 10}$$

where
  $C_i$=the capacity of the resource i,
  $\theta_i$=the required theta value used to calculate the effective bandwidth for this mix of calls on the element.
  $a_{ij}$=the effective bandwidth calculated from the Chernoff bound (utilising the $\theta$ value).

This reduces to a linear relation. For two call types, the QoS relation for element 1 for the new call to be accepted might be of the form $0.1nc_{11}+0.01nc_{12}-0.5 \leq 10^{-2}$, for example.

To perform this calculation the element manager 5a obtains a $\theta$ with reference to the table of $\theta$ values in storage areas 4f which were created on initialisation, block 6. This is the appropriate value according to the traffic mix of classes being selected. Each $\theta$ provides a tangent to an acceptance boundary for the particular mix of calls. It can be thought of as the "temperature" of the multiplexing potential. A low value for theta implies that the potential for multiplexing gain given the call mix is high. Conversely, a high value of theta implies that the potential for multiplexing gain with this mix of calls is low.

Figure 7:
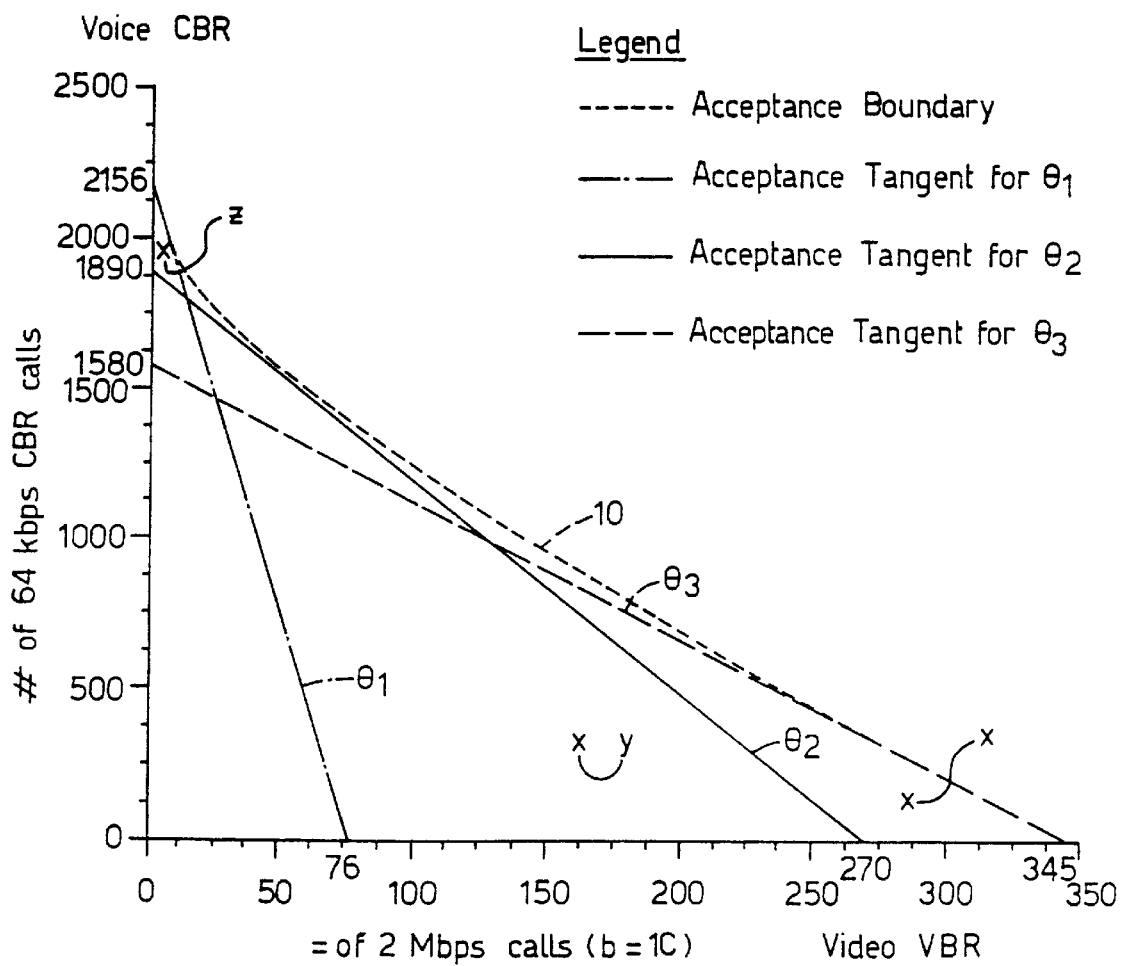
FIG. 7 is an explanatory diagram showing the acceptance boundary for a mix of two call classes.

Consider for example the mix of constant bit rate voice data and variable bit rate video data shown as a graph in FIG. 7. The acceptance boundary is shown in broken outline 10 and the $\theta$ values stored in the table of $\theta$ values are $\theta_1$, $\theta_2$ and $\theta_3$.

For X on the graph $\theta_3$ is the $\theta$ value to be used to calculate the effective bandwidths.

Similarly for point y, $\theta_2$ is the appropriate value to use and for point z $\theta_1$ is the appropriate value.

If the QoS falls below that required for the element then the call is rejected for the element, block 15. Another element has to be found, block 16, or the call is not accepted on to the network 1 which returns to idle, block 7.

If the value of $nc_{ik}$ is zero the element manager 5a recalculates the quality of service relation for the element i, block 13. It does this by extracting from the database table of $\theta$ values stored in storage area 4f, a $\theta$ value appropriate to the new traffic mix. Before determining whether or not a call is accepted it assumes that it will be accepted in order to select the appropriate $\theta$ value. If the connection belongs to a class which is new to the element the QoS relation stored in the nodes short term memory data store overwrites the relation stored in the QoS data store.

That value of $\theta$ is then inserted into relationship 1. If a new QoS for the element i is less than or equal to the target call loss probability then the new call is accepted, otherwise it is rejected. If the call is accepted the new QoS relation is written in the short term memory store 4e as represented by block 17.

The next element in the route through the network 1 is then connected and the process repeated until the last element for connection is reached, block 18. The call is then accepted throughout the network, block 19.

When all the elements in an end-to-end connection have accepted the connection, the calls in progress data storage area is updated by adding one to the class of connection that has been accepted. When the call finishes that is to say clears down, block 20, the calls in progress data storage area is again updated, block 21.

To further illustrate the way in which the embodiment of the invention operates there shall be described a number of network examples each one comprising network nodes and elements as earlier described and configured and operated in the same manner.

Figures 8, 9:
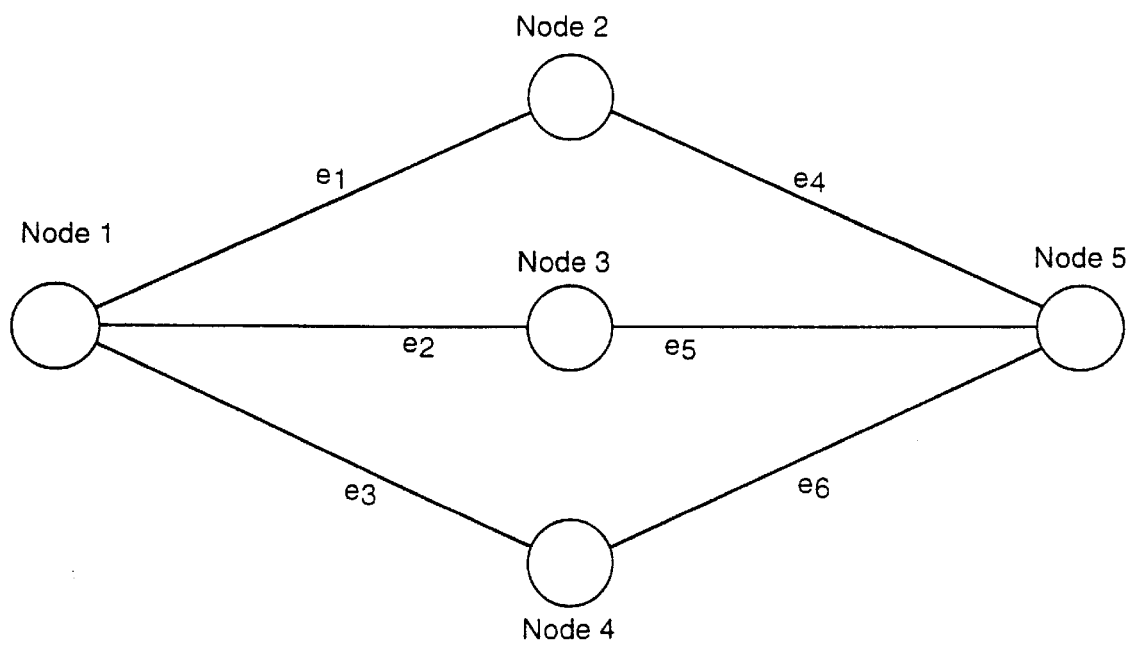
FIG. 8 is a diagram of a data structure used in an embodiment of the invention.
FIG. 9 shows a further communications network.

In a first example of a five node, six element network shown in FIG. 9, the available capacity of all the links or elements is 140 Mbps. Ideally, calls entered the network declare their mean bit rate as well as their peak bit rate. If only the peak rate is given, then the call is assumed to CBR where the mean is the peak.

For call traffic that is on/off or burst type the Moment Generating Function is $$M(t) = m_1 \exp(\theta p_1) + 1 - M_1$$

where $p_1$ = the peak bit rate requirement for a call of class 1.

$m_1$ = the mean bit rate requirement for a call of class 1 (expressed as peak/mean).

$\theta$ = the infimum $\theta$ or "temperature".

There are two service classes in the network defined by the vector $S = (S_1, S_2)$ where each of the elements in S is defined by the following service class definitions.

Service Class $S_1$, telephony service having a declared peak range of (0, 0.064]Mbps being constant bit rate (CBR) requiring quality of service (QoS) of $1 \times 10^{-2}$; and Service Class $S_2$, video telephony service (HQ) having a declared peak range of 0.064, 2] and being a variable bit rate (VBR) requiring a quality of service of $1 \times 10^{-7}$. This data is held as earlier described in the call class storage area 4a.

With calls of different classes sharing the link the lower cell loss probability of $1 \times 10^{-7}$ must be maintained.

In this example, there are $$\sum_{i=1}^{2} {}^2 C_i = 3$$

values for $\theta$ in the database. This formula is a general dimensioning algorithm for the $\theta$ database, that is, the maximum number of $\theta$ values to be stored in the database for n call classes is $$\sum_{i=1}^{n} {}^n C_i.$$

(This number can be reduced by only storing non-unity values for $\theta$). The set of $\theta$ values is defined by $A = \{\theta_{\{1\}}, \theta_{\{1,2\}}, \theta_{\{2\}}\}$. For this example, the set is thus $A = \{1, 0.8333, 0.4143\}$. The first entry is a value which is chosen to be one arbitrarily because in this case there are only calls of service class $S_1$ on the network which are constant bit rate CBR. Peak rate allocation is then used and statistical multiplexing is not possible. All the values for $\theta$ are stored in the storage area 4f.

Suppose at a particular point in time the network carries a load such that elements $e_2$ and $e_5$ carry six hundred 64 kbps CBR voice calls and twenty three 2 Mbps VBR high quality video calls. There is no other traffic on any of the other elements $e_1$, $e_2$, $e_3$ or $e_5$.

The calls in progress matrix C in P is as earlier described, stored in storage area 4c. The matrix is:

$$C \text{ in } P = \begin{bmatrix} \text{No of calls of class } S_1 \text{ and } S_2 \text{ on } e_1 & \text{No of calls of class } S_1 \text{ on } e_1 & \text{No of calls of class } S_2 \text{ on } e_1 \\ \text{No of calls of class } S_1 \text{ and } S_2 \text{ on } e_2 & \text{No of calls of class } S_1 \text{ on } e_2 & \text{No of calls of class } S_2 \text{ on } e_2 \\ \text{No of calls of class } S_1 \text{ and } S_2 \text{ on } e_3 & \text{No of calls of class } S_1 \text{ on } e_3 & \text{No of calls of class } S_2 \text{ on } e_3 \\ \text{No of calls of class } S_1 \text{ and } S_2 \text{ on } e_4 & \text{No of calls of class } S_1 \text{ on } e_4 & \text{No of calls of class } S_2 \text{ on } e_4 \\ \text{No of calls of class } S_1 \text{ and } S_2 \text{ on } e_5 & \text{No of calls of class } S_1 \text{ on } e_5 & \text{No of calls of class } S_2 \text{ on } e_5 \\ \text{No of calls of class } S_1 \text{ and } S_2 \text{ on } e_6 & \text{No of calls of class } S_1 \text{ on } e_6 & \text{No of calls of class } S_2 \text{ on } e_6 \end{bmatrix}$$

for the above conditions this will be $S_1$ is 600×64 Kbps CBR $S_2$ is 23×2 Mpbs VBR.

$$C \text{ in } P = \begin{bmatrix} 0 & 0 & 0 \\ 623 & 600 & 23 \\ 0 & 0 & 0 \\ 0 & 0 & 0 \\ 623 & 600 & 23 \\ 0 & 0 & 0 \end{bmatrix}$$

The QoS relations are calculated using the peak and mean bit rates of the two service classes and $\theta_{\{1,2\}}$ selected from the data storage area since both call classes are using the elements 2 and 5.

$$QoS_2 \text{ and } QoS_5 \leq = 0.0232 n_{21} + 0.1552 n_{22} - 50.67.$$

The resulting matrix is $$QoS \text{ Relations Matrix} = \begin{bmatrix} 0 & 0 & 0 & 0 \\ 0.0232 & 0.1552 & 50.667 & -7 \\ 0 & 0 & 0 & 0 \\ 0 & 0 & 0 & 0 \\ 0.0232 & 0.1552 & 50.667 & -7 \\ 0 & 0 & 0 & 0 \end{bmatrix}$$

Suppose a new call of video call type requiring a peak bit rate of 2 Mbps and a mean bit rate of 200 kbps requires connection between nodes 1 and 5 of the network shown in FIG. 10. If the first element chosen by the element manager 5a of node 1 is $e_2$, since this element already carries this class of call, the $QoS_2$ is checked first, block 12, $$QoS_1 \leq 0.0232 \times 600 + 0.1552 \times (23+1) - 50.667$$

since there are six hundred sixty four kbps CBR Voice calls already carried by the element and twenty three existing and one additional two Mbps video calls. Therefore $QoS_2 \leq -33$ (=cell loss probability of $10^{-33}$)

The QoS is thus maintained, block 14, since $1 \times 10^{-33}$ cell loss probability is less than the required quality of service which is $1 \times 10^{-7}$. The next element chosen is $e_5$, block 10 and the earlier described steps repeated. An end to end connection exists since $e_5$ is the last element for connection, block 18, and the call is accepted, block 19.

Suppose the next call that requires routing through the network is carried on elements $e_1$ and $e_4$. The new call is of a new class, where there are 1000×64 kbps calls already on the route $e_1$, $e_4$. With the same conditions as before, that is to say, no calls have been cleared down, block 20, load is therefore:

600×64 kbps CBR voice calls on elements $e_2$ and $e_5$
24×2 Mbps VBR High Quality Video calls on $e_2$ and $e_5$ and
1000×64 Kbps voice calls on elements $e_1$ and $e_4$.

For this case the Calls in Progress matrix becomes $$C \text{ in } P = \begin{bmatrix} 0 & 0 & 0 \\ 624 & 600 & 24 \\ 0 & 0 & 0 \\ 0 & 0 & 0 \\ 624 & 600 & 24 \\ 0 & 0 & 0 \end{bmatrix}$$

and the resulting Qos relations matrix is $$QoS \text{ Relations Matrix} = \begin{bmatrix} 0.0278 & 0 & 60.801 & -2 \\ 0.0232 & 0.1552 & 50.667 & -7 \\ 0 & 0 & 0 & 0 \\ 0.0278 & 0 & 60.801 & -2 \\ 0.0232 & 0.1552 & 50.667 & -7 \\ 0 & 0 & 0 & 0 \end{bmatrix}$$

In this instance both the values of $\theta_{\{1\}}$ and $\theta_{\{1,2\}}$ are being used. Since $\theta_{\{1\}}$ refers to CBR rate calls only, which require peak allocation, the QoS relation is just a constraint on the maximum number of connections which can be accepted onto the link that is to say capacity/Peak bit rate.

Suppose the new call is again a video call of type $S_2$. If the first element chosen by node 1 is $e_1$, then since this type of call is of a type not already using element $e_1$ the relation of $QoS_1$ is recalculated (blocks 8, 9, 10, 11 and 13).

$QoS_1 \leq 0.0232 \times 1000 + 0.1552 \times 1 - 50.667$ $QoS \leq -27$.

That is to say the cell loss probability is less than or equal to $1 \times 10^{-27}$ which is better than the required quality of service and the call accepted on element $e_1$. The next element chosen is $e_4$ and since this has the same traffic load, the same conditions prevail and the call is accepted for element $e_4$ and the relation is for element $e_4$ is updated in the short term memory store 4g. An end to end route exists, so the call is accepted for the network (block 19). The calls in progress matrix is updated (block 21) and the QoS relation matrix updated from the short term memory stores 4g.

Suppose the load on the network has increased to

600×64 Kbps CBR voice calls on elements $e_2$ and $e_5$
24×2 Mbps VBR Video calls on elements $e_2$ and $e_5$
1000×64 Kbps voice calls on elements $e_1$ and $e_4$
1×2 Mbps VBR Video calls on elements $e_1$ and $e_4$
1000×64 Kbps voice calls on elements $e_3$ and $e_6$
132×2 Mbps VBR High Quality Video calls on elements $e_3$ and $e_6$.

Under this load the Calls in Progress matrix is $$C \text{ in } P = \begin{bmatrix} 1001 & 1000 & 1 \\ 624 & 600 & 24 \\ 1132 & 1000 & 132 \\ 1001 & 1000 & 1 \\ 624 & 600 & 24 \\ 1132 & 1000 & 132 \end{bmatrix}$$

The QoS relation matrix is then $$QoS \text{ Relations Matrix} = \begin{bmatrix} 0.0232 & 0.1552 & 50.667 & -7 \\ 0.0232 & 0.1552 & 50.667 & -7 \\ 0.0232 & 0.1552 & 50.667 & -7 \\ 0.0232 & 0.1552 & 50.667 & -7 \\ 0.0232 & 0.1552 & 50.667 & -7 \\ 0.0232 & 0.1552 & 50.667 & -7 \end{bmatrix}$$

It will be noted that since all the elements $e_1$ to $e_6$ carry calls of the same classes that the QoS relations (the effective bandwidths) are the same.

With this load, suppose a video call of class $S_2$ needs to pass through the network from node 1 to node 6. The element manager 5a at node 1 considers routing it via element $e_3$.

The new call is of a class already using elements $e_3$, so the QoS relation for element $e_3$, $QoS_3$, is checked (block 11).

$QoS_3 \leq 0.0232 \times 1000 + 0.1552 \times (132+1) - 50.667$ $QoS_3 \leq -6.9$.

Since the video call requires a guaranteed cell loss probability of $1 \times 10^{-7}$ the call is rejected for element $e_3$ (block 15). An alternative element is then chosen (block 16 and block 10) and the process repeated.

In an alternative embodiment of the invention it may be possible to dispense with the tables of $\theta$ values and replace it with a data store containing the information to calculate the $\theta$ values in an on-line manner.

The method may be improved by the use of a greater number of call classes than used in the above-described embodiment. It may also be possible to define and add a new class to the data store if an unidentified call appears on the network. Alternatively, the database may be updated manually.

By increasing the number of service classes it will means that each class of traffic is defined more accurately, so that traffic characteristics will be better catered for. This will result in a greater statistical gain but of course the data storage requirements will increase.

When choosing the value of $\theta$ from a table of $\theta$ values, or various $\theta$ values derived from more than one moment generating functions, it may be possible to select the most appropriate $\theta$ value with reference to the time of day. It will be known from an historical database that the traffic will have a certain mix of classes at a particular time of day. As the network is utilised an historical database may be built up which monitors the $\theta$ values selected and the efficiency of the resulting multiplexing method and the $\theta$ values periodically updated to take account of this performance data in order to optimise the multiplexing gain. This could be done manually but it is envisaged that the network could be configured to do this automatically on a periodical basis. Instead of using a number of θ values, in some embodiments a single value may be used.

The θ table $4f$ could be provided as a set of θ tables as shown in FIG. 10. Table $4f_1$ could be used when the time of day is in range $t_1$, for example 8 am to 12 am. Table $4f_2$ could be used when the time of day is in the range $t_2$, for example 12 am to 6 pm. Table $4f_3$ could be used when the time of day is within the range $t_3$, for example 6 pm to 8 am.

To select the appropriate table, the element manager $5a$ includes a clock. The time of day is determined by the element manager $5a$ referring to the clock and then according to the time of day selecting an appropriate one of the tables $4f_1$, $4f_2$ or $4f_3$.

In a preferred embodiment of the invention the θ values are selected on the basis of thresholds of calls. This requires the number of calls in progress on the link for each service class to be monitored. The thresholds would be stored in a threshold table as shown in FIG. 8. When the threshold is reached the next value of θ is chosen.

Consider the various possible mixture of call types as shown in FIG. 7. If the element manager $5a$ determines that the number of calls of Video VBR type is between 270 to 345 calls, then a θ value $θ_3$ could be selected (see FIG. 8). Similarly if the number of 64 kbps CBR calls is in the range 1890–2156 $θ_1$ would be used. Otherwise, $θ_2$ would be used.

What is claimed is:

1. A method of controlling acceptance of calls for a node in a communications network, the node having a bandwidth carrying capacity C and being required to provide a given quality of service, the method comprising calculating, for an expression for the quality of service which will be provided by the node for different numbers of calls accepted by the node, which expression corresponds to Chernoff's theorem and is a function of (a) the number of calls, (b) the bandwidth carrying capacity C of the node, and (c) a quantity t represents a working variable the value θ of which is appropriate for each of the different numbers of calls is that which minimises the value of said expression the value of θ appropriate to selection of numbers of calls which form a subset of said different numbers, substituting into said expression the number of calls which will be carried by the node if a requested call is accepted and also the thus-calculated value of θ which is most appropriate for this number of calls, comparing the resulting value of said expression with the quality of service required from the node, and accepting the requested call if said resulting value is not less than the given quality of service, wherein said expression is n(ln(M((t)−tC where M(t) is the moment-generating function and n is the number of calls.

2. A method as claimed in claim 1, wherein each said number of calls is constituted by a specification of the respective numbers of calls in a plurality of call classes.

3. A method as claimed in claim 1, wherein each quality of service is a call loss probability.

4. A method as claimed in claim 1, wherein the calculated values of θ are stored in a memory structure table.

5. A method as claimed in claim 1 wherein said thus-calculated value of θ which is most appropriate for this number of calls is selected on the basis of comparing this number of calls with at least one threshold value.

6. Apparatus for controlling acceptance of calls for a node in a communications network, the node having a bandwidth-carrying capacity C and being required to provide a given quality of service, the apparatus comprising means for calculating, for an expression for the quality of service which will be provided by the node for different numbers of calls accepted by the node, which expression corresponds to Chernoff's theorem and is a function of (a) the number of calls, (b) the bandwidth carrying capacity C of the node, and (c) a quantity t representing a working variable the value θ of which is appropriate for each of the different numbers of calls is that which minimises the value of said expression, the value of θ appropriate to a selection of numbers of calls which form a subset of said different numbers and including, means for substituting into said expression the number of calls which will be carried by the node if a requested call is accepted and also the thus-calculated value of θ which is most appropriate for this number of calls, means for comparing the resulting value of said expression with the quality of service required from the node, and means for accepting the requested call if said resulting value is not less than the given quality of service, wherein said expression n(1n(M(t))−tC where M(t) is the moment-generating function and n is the number of calls.

7. Apparatus as claimed in claim 5, wherein each said number of calls is constituted by a specification of the respective numbers of calls in a plurality of call classes.

8. Apparatus as claimed in claim 7, wherein each quality of service is a call loss probability.

9. Apparatus as claimed in claim 7, including a memory structure table which stores the calculated value of θ.

10. Apparatus as claimed in claim 7, including means for selecting said thus-calculated value of θ which is most appropriate for this number of calls on the basis of comparing the number of calls with at least one threshold value.

11. A method of controlling acceptance of a call for a node in a communication network, the node having a call carrying capacity and the network having a required quality of service, the method comprising:

determining theta values for respective mixes of calls, determining from said theta values, effective bandwidths for respective call types that would be handled by the node were the call to be accepted;

determining from said effective bandwidths and said capacity a quality of service were the calls to be accepted;

comparing the determined quality of service with the required quality of service and if the determined quality of service is not worse than the required quality of service, accepting the call for the node and wherein;

said theta value determination includes a comparison of the number of calls of a particular call type that would be carried by the node were the call to be accepted and at least one threshold value of number of calls, wherein the theta value is determined using the Chernoff theorem by:

determining a function, f(t), of the probability of the node being overloaded if the call is accepted; and determining a theta value θ which gives an infimum of the function f(t), wherein the function f(t) is nln(M(t))−tC where M(t) is a moment generating function for call traffic, n is the number of calls on the node if the call is accepted for the node, and t represents a working variable for determining the value θ.

12. A method as in claim 11 wherein the quality of service parameter is the cell loss probability.

13. A method as in claim 11 wherein a plurality of theta values are calculated for respective different anticipated classes of call types carried by the network each class corresponding to a mix of call types.

14. A method as in claim 11 where the theta value or values is/are stored in a memory structure table.

15. A method as in claim 14 wherein the theta values are stored in a memory structure with associated classes.

16. A method as in claim 15 wherein incoming calls to the network or nodes of a network are classified into a class and the theta value appropriate for that class obtained by reference to the memory structure storing the theta values and associated classes.

17. A method as in claim 11 wherein there is provided a memory structure of threshold values of number of calls and corresponding appropriate theta values.

18. A method as in claim 11 wherein there is provided a memory structure of threshold values of numbers of calls and corresponding appropriate theta values.

19. A method as in claim 18 wherein reference is made to the time of day to select at least one theta value.

20. A method as in claim 11 wherein performance of the communications network is monitored and the at least one theta value or some of the theta values are modified to enhance the performance.

21. A method of controlling acceptance of a call for a node in a communication network, the node having a call carrying capacity and the network having a required quality of service, the apparatus comprising:

means for determining a theta value for respective mixes of calls;

means for determining an effective bandwidth for respective call types that would be handled by the node were the call to be accepted;

means for determining from said effective bandwidths and said capacity a quality of service were the call to be accepted;

means for comparing the determined quality of service with the required quality of service and if the determined quality of service is not worse than the required quality of service, accepting the call for the node; and wherein said theta value determining means compares the number of calls of a particular call type that would be carried by the node were the call to be accepted and at least one threshold value of number of calls, wherein said theta value determining means is operable to determine the theta value using the Chernoff theorem and comprises means for determining a theta value which gives an infimum of a function, f(t) of the probability of the node being overloaded if the call is accepted;

wherein the function f(t) is nln(Mt))−tC where M(t) is a moment generating function for call traffic, n is the number of calls on the node if the call is accepted for the node, and t represents a working variable for determining said theta value.

22. Apparatus as in claim 21 wherein the means for determining a quality of service parameter determines a cell loss probability.

23. Apparatus as in claim 21 further comprising memory to store the theta value for subsequent use.

24. Apparatus as in claim 21 wherein the means for determining theta values determines a theta value for different anticipated classes of call types to be carried by the network, each class corresponding to a mix of call types.

25. Apparatus as in claim 23 further comprising memory means to store the theta values as a table of theta values and corresponding classes of calls.

26. Apparatus as in claim 24 including means to classify incoming calls to the network and for obtaining a theta value appropriate to that class from the memory means storing the theta values and corresponding classes of calls.

27. Apparatus as claimed in claim 21 including means for determining a time of day and to select a theta value or values appropriate to the time of day.

28. Apparatus as in claim 21 including means to monitor the performance of the communications network and to modify a theta value or values to be used to determine a quality of service from an initial value to a modified value in order to improve the performance of the communications network.

29. Apparatus as in claim 28 wherein memory is provided to store the modified value or values.

* * * * *